United States Patent
Ichikawa et al.

(10) Patent No.: US 7,171,293 B2
(45) Date of Patent: Jan. 30, 2007

(54) VEHICLE DRIVE SYSTEM CONTROLLER

(75) Inventors: Takashi Ichikawa, Aichi (JP);
Terumasa Suyama, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 533 days.

(21) Appl. No.: 10/723,006

(22) Filed: Nov. 26, 2003

(65) Prior Publication Data
US 2004/0107031 A1    Jun. 3, 2004

(30) Foreign Application Priority Data
Nov. 28, 2002   (JP) ............................. 2002-344979

(51) Int. Cl.
*G06F 19/00* (2006.01)
(52) U.S. Cl. .............. 701/36; 340/426.1; 340/5.53
(58) Field of Classification Search .............. 701/1, 701/36; 340/425.1, 426.1, 426.11, 426.13, 340/426.16, 426.17, 426.24, 426.28, 5.1, 340/5.53, 5.6, 5.61, 5.8, 5.81, 5.82
See application file for complete search history.

(56) References Cited

U.S. PATENT DOCUMENTS

| | | | | |
|---|---|---|---|---|
| 5,812,067 A | * | 9/1998 | Bergholz et al. ........... | 340/5.52 |
| 6,400,835 B1 | * | 6/2002 | Lemelson et al. .......... | 382/118 |
| 6,498,970 B2 | * | 12/2002 | Colmenarez et al. ......... | 701/36 |
| 6,831,993 B2 | * | 12/2004 | Lemelson et al. .......... | 382/118 |
| 6,879,247 B2 | * | 4/2005 | Shimomura et al. ... | 340/426.18 |
| 2002/0097145 A1 | * | 7/2002 | Tumey et al. ................ | 340/426 |
| 2002/0152010 A1 | * | 10/2002 | Colmenarez et al. ......... | 701/36 |
| 2003/0095039 A1 | * | 5/2003 | Shimomura et al. ..... | 340/426.1 |

FOREIGN PATENT DOCUMENTS

| | | |
|---|---|---|
| JP | 2001-289142 A | 10/2001 |
| JP | 2001-311333 A | 11/2001 |

* cited by examiner

*Primary Examiner*—Gary Chin
(74) *Attorney, Agent, or Firm*—Crompton, Seager & Tufte, LLC

(57) ABSTRACT

A drive system controller that improves the level of security for a vehicle. A main microcomputer activates an image recognizer when wireless communication is established with a portable device. The image recognizer images a vehicle occupant to generate image data and uses the image data to verify whether the vehicle occupant is an authorized user. The main microcomputer enables the starting of the engine when wireless communication with the portable device is established and the image recognizer verifies that the vehicle occupant is an authorized user.

7 Claims, 6 Drawing Sheets

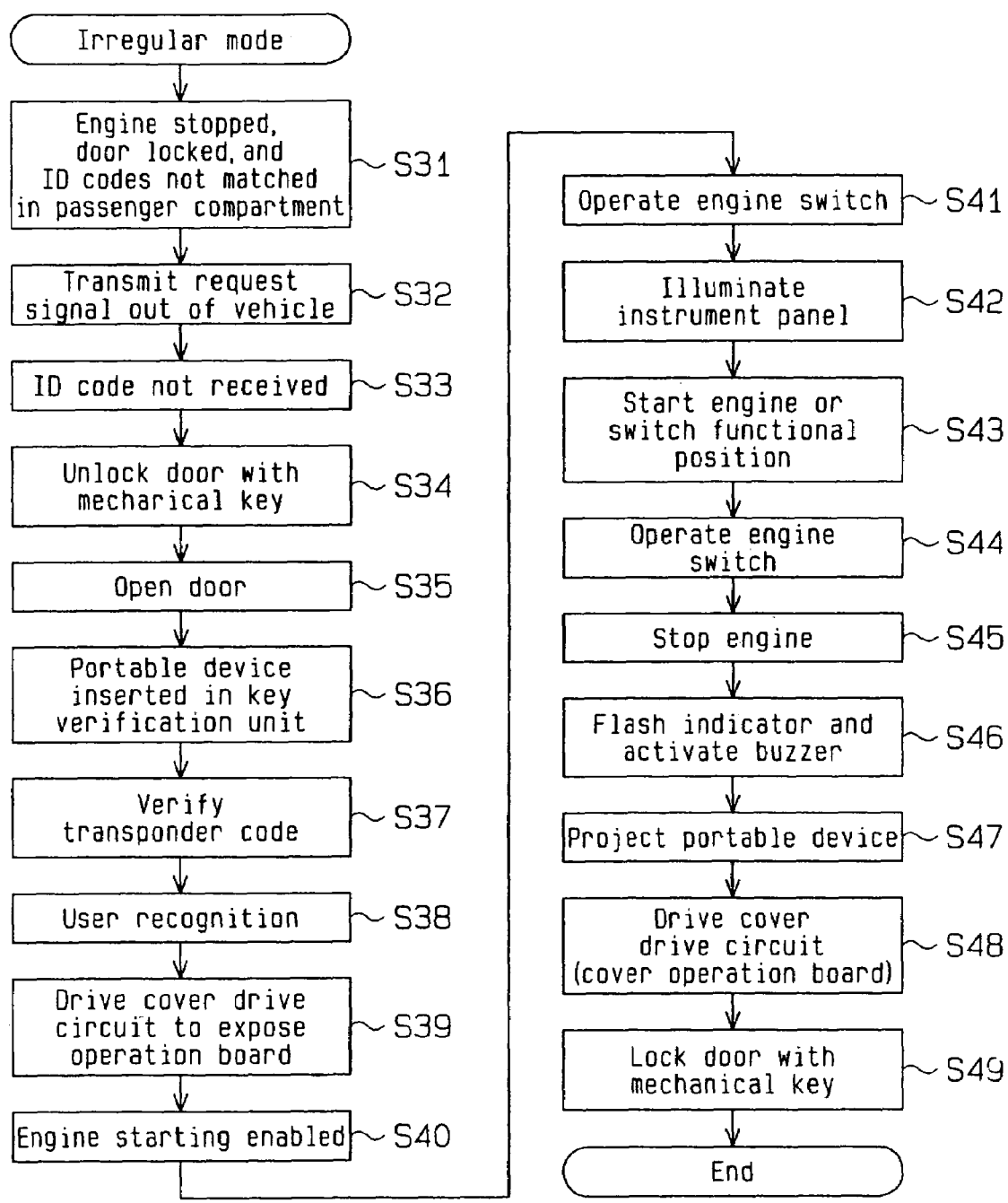

VEHICLE DRIVE SYSTEM CONTROLLER

BACKGROUND OF THE INVENTION

The present invention relates to a method for improving the level of security in a vehicle, and more particularly, to a controller for controlling the starting and stopping of an engine.

A conventional vehicle key is inserted in a key cylinder, which is arranged on a steering column. A driver turns the vehicle key and moves the key cylinder between functional positions to start and stop the engine. However, in such prior art mechanical key systems, the engine may be started or stopped by using a copied key or by picking the lock of the key cylinder. Accordingly, there is a demand for a device that improves the security level of a vehicle.

Japanese Laid-Open Patent Publication Nos. 2001-289142 and 2001-311333 describe an engine drive control system that performs electronic verification to enable the starting of the engine. This improves the security level of the vehicle. The engine drive control system includes a portable device, which is provided with a communication function, and an engine drive controller, which is installed in the vehicle. The starting of the engine is enabled under the condition that communication is properly established between the portable device and the engine drive controller. When an engine starting switch is operated to start the engine, the engine must be in the state in which starting is enabled. This prevents a third person, who is not carrying the portable device, from starting the engine. This also simplifies the operations for starting the engine since the engine may be started just by operating the engine starting switch.

However, in such an engine control system, anyone carrying the portable device may start the engine. Thus, when the driver loses the portable device and a third person finds the portable device, the third person would be able to start the engine.

SUMMARY OF THE INVENTION

Accordingly, it is an object of the present invention to provide a vehicle controller that improves the security level of a vehicle.

To achieve the above object, the present invention provides a controller of a vehicle having an engine for use with an authorized key having a communication function. The controller includes a microcomputer for controlling the engine. The microcomputer is capable of communicating with the authorized key. A recognizer is activated when predetermined conditions, including establishment of communication between the microcomputer and the authorized key, are satisfied to verify whether a vehicle occupant is an authorized user. The microcomputer enables the starting of the engine when communication is established with the authorized key and the recognizer verifies the vehicle occupant as being the authorized user.

Another aspect of the present invention is a method for controlling a vehicle having an engine and a door. The method includes transmitting a request signal to a predetermined area defined around the vehicle, unlocking the door when receiving a response signal in response to the request signal, verifying whether a vehicle occupant is an authorized user, and enabling starting of the engine when the vehicle occupant is verified as the authorized user.

A further aspect of the present invention is a system for controlling an engine of a vehicle having a passenger compartment. The system includes an authorized key capable of wireless communication. A key receiver is arranged in the passenger compartment of the vehicle to receive the authorized key. A recognizer is arranged in the passenger compartment to image a vehicle occupant and verify whether a vehicle occupant is an authorized user. A communication circuit performs wireless communication with the authorized key. A microcomputer is connected to the recognizer and the communication circuit. The microcomputer activates the recognizer when wireless communication is established between the authorized key and the communication circuit, enables starting of the engine when the recognizer verifies that the vehicle occupant is an authorized user, and disables starting of the engine when wireless communication is not established between the authorized key and the communication circuit unless a predetermined condition is satisfied.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 7 is a flowchart for an irregular mode.

DETAILED DESCRIPTION OF THE PREFERRED EMBODIMENTS

A drive system operation apparatus 3 according to a preferred embodiment of the present invention will now be discussed.

Figure 1:
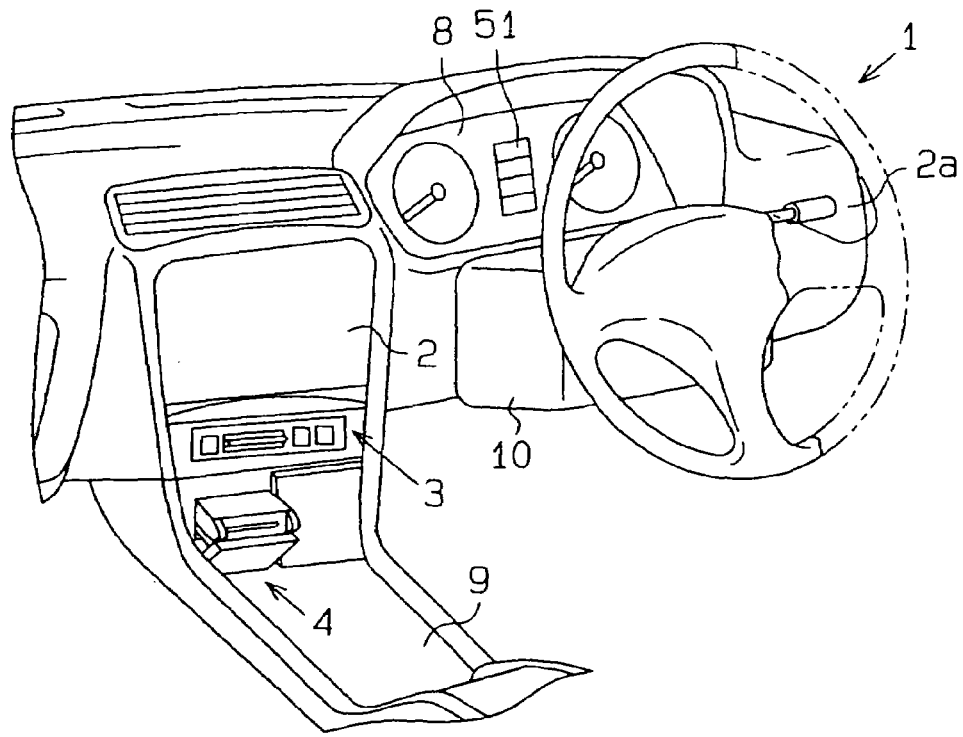
FIG. 1 is a perspective view showing a passenger compartment including a drive system operation apparatus and a key holder according to a preferred embodiment of the present invention.
Figure 5:
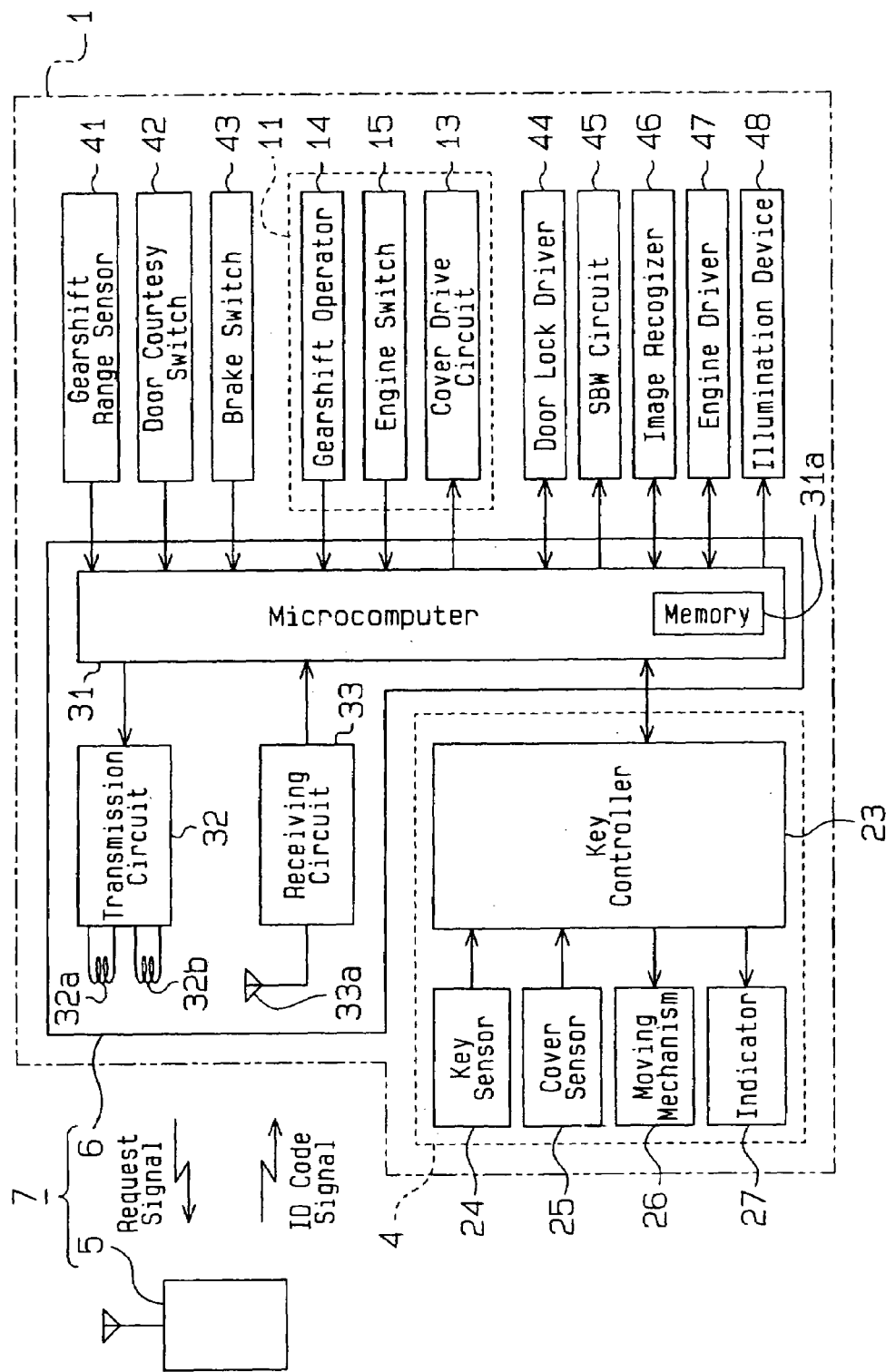
FIG. 5 is a block diagram showing a vehicle drive control system according to a preferred embodiment of the present invention.

As shown in FIG. 1, an instrument panel 2, which is arranged in a passenger compartment of a vehicle 1, includes a vehicle drive system operation apparatus 3 and a key verification unit 4, which receives an authorized key, or a portable device 5 (refer to FIG. 5). It is preferred that the drive system operation apparatus 3 and the key verification unit 4 be arranged between the driver seat and the passenger seat.

With reference to FIGS. 2, 3A, 3B, and 5, the drive system operation apparatus 3 includes an operation board 11, a shutter, or a movable operation board cover 12, and a cover drive circuit 13. The operation board 11 has an external surface facing towards the driver, and includes a gearshift operator 14, an engine operator, or engine switch 15 for starting and stopping the engine, and a range indicator 16.

The gearshift operator 14 and the engine switch 15 are located near each other.

The gearshift operator 14 includes a parking switch 14a and a gearshift switch 14b. It is preferred that the parking switch 14a be a momentary type push button switch. Further, it is preferred that the gearshift switch 14b be a lever switch that is normally located at a neutral position, moved to an upward position or downward position from the neutral position, and returned to the neutral position from the upward or downward position. The driver operates the parking switch 14a or the gearshift switch 14b to switch the transmission between gearshift ranges (gearshift ranges P, R, N, and D). For example, when the parking switch 14a is operated, the gearshift range of the transmission shifts to the parking (P) range. When the gearshift switch 14b is operated, the gearshift range of the transmission is shifted to one of the P range, the reverse (R) range, the neutral (N) range, and the drive (D) range. More specifically, if the parking switch 14a is operated when the vehicle velocity is zero and the engine is running, the transmission shifts to the P range regardless of which one of the R, N, and D ranges the transmission is in. When the gearshift switch 14b is pushed downward, the gearshift range is shifted in a sequential manner in the order of the P range, R range, N range, and D range. When the gearshift range is pushed upward, the gearshift range is shifted in a sequential manner in the order of the D range, N range, R range, and P range. Shifting from the R range to the P range is enabled only when the vehicle velocity is zero.

A light emitting device, such as an LED, is arranged in the parking switch 14a. The light emitting device is illuminated when the transmission is in the P range to highlight the switch 14a.

Figure 2:
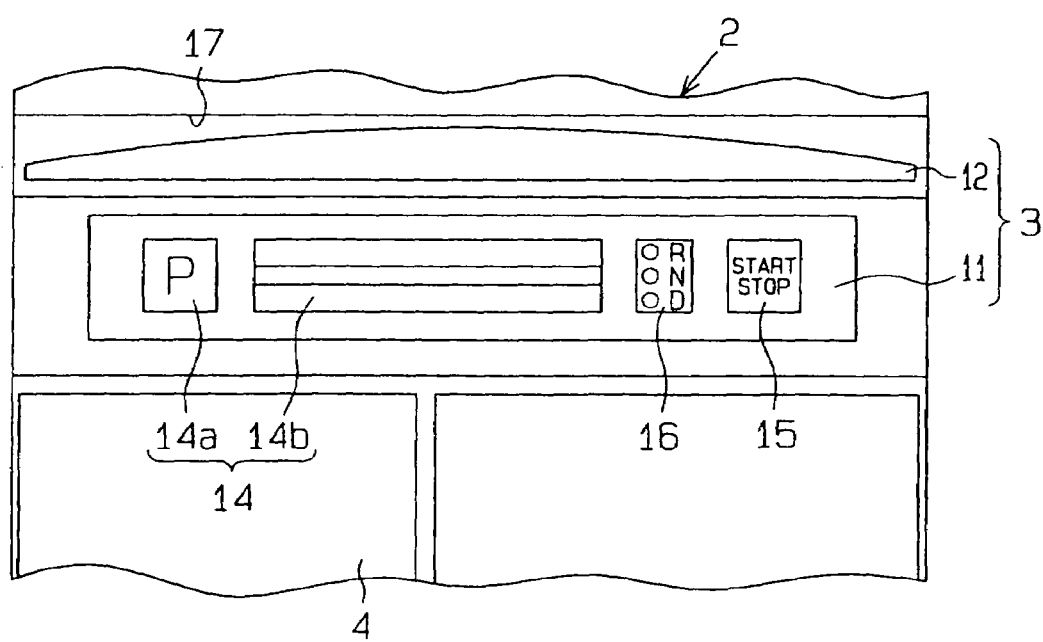
FIG. 2 is a front view showing the drive system operation apparatus of FIG. 1.

Referring to FIG. 2, the letters R, N, and D are marked on the surface of the range indicator 16. A light emitting device, such as an LED, is arranged next to each letter. When the transmission is in the R range, the N range, or the D range, the light emitting device corresponding to the present gearshift range is illuminated to indicate the present gearshift range. The light emitting device may also illuminate the corresponding letter.

A further light emitting device is arranged in the engine switch 15. The engine switch 15 is preferably a momentary type push button switch. The engine switch 15 is operated under predetermined conditions to start and stop the engine and to perform shifting between functional positions for an electric system of the vehicle.

Figure 3A:
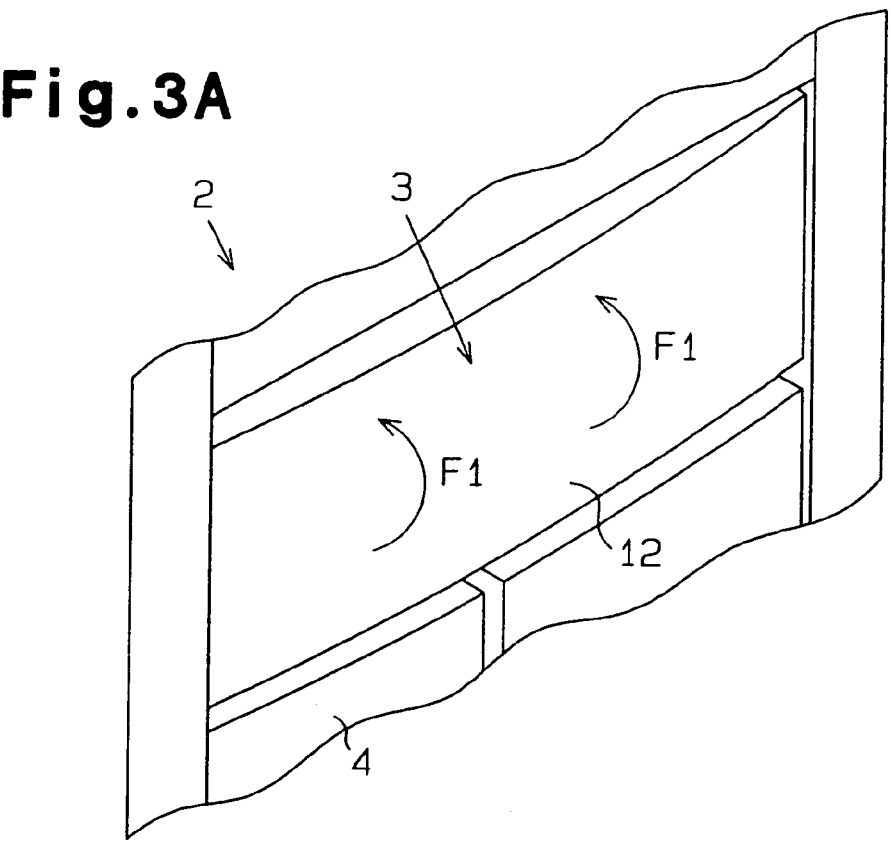
FIGS. 3A and 3B are perspective views showing the drive system operation apparatus of FIG. 1.
Figure 3B:
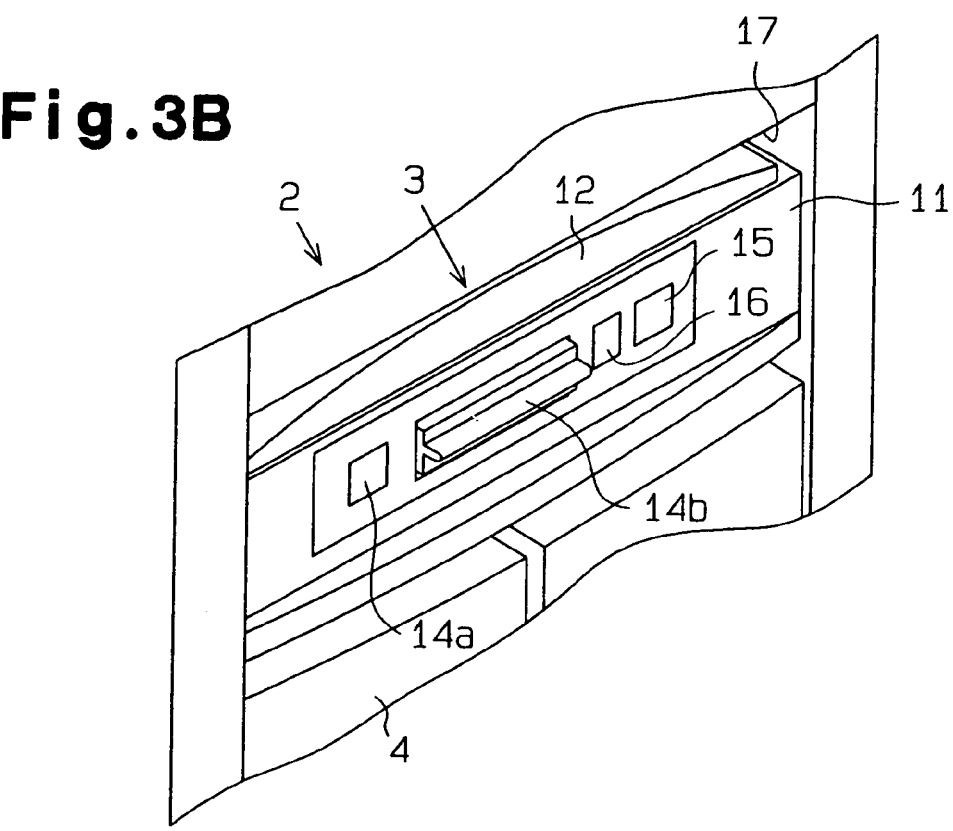

The operation board cover 12 covers and exposes the operation board 11. As shown in FIG. 3A, the operation board cover 12 is normally arranged at a closed position where it covers the operation board 11. The driver cannot operate the operation board 11 when the operation board cover 12 is located at the closed position. When predetermined conditions are satisfied, the cover drive circuit 13 moves and opens the operation board cover 12 in the direction indicated by the arrows F1. As shown in the states of FIGS. 2 and 3B, the operation board cover 12 is retained in a retaining space 17 located above the operation board 11. This exposes the operation board 11. When the operation board cover 12 is located at this opened position, the driver may operate the operation board 11. The operation board cover 12 returns to the closed position from the opened position when predetermined conditions are satisfied.

With reference to FIGS. 1, 3A, 3B, and 4, the key verification unit 4 is located under the drive system operation apparatus 3. As shown in FIG. 4B, the key verification unit 4 includes a holder 21 for receiving the authorized key (portable device) 5, and a movable key cover 22, which functions as a shutter for the holder 21.

Figure 4A:
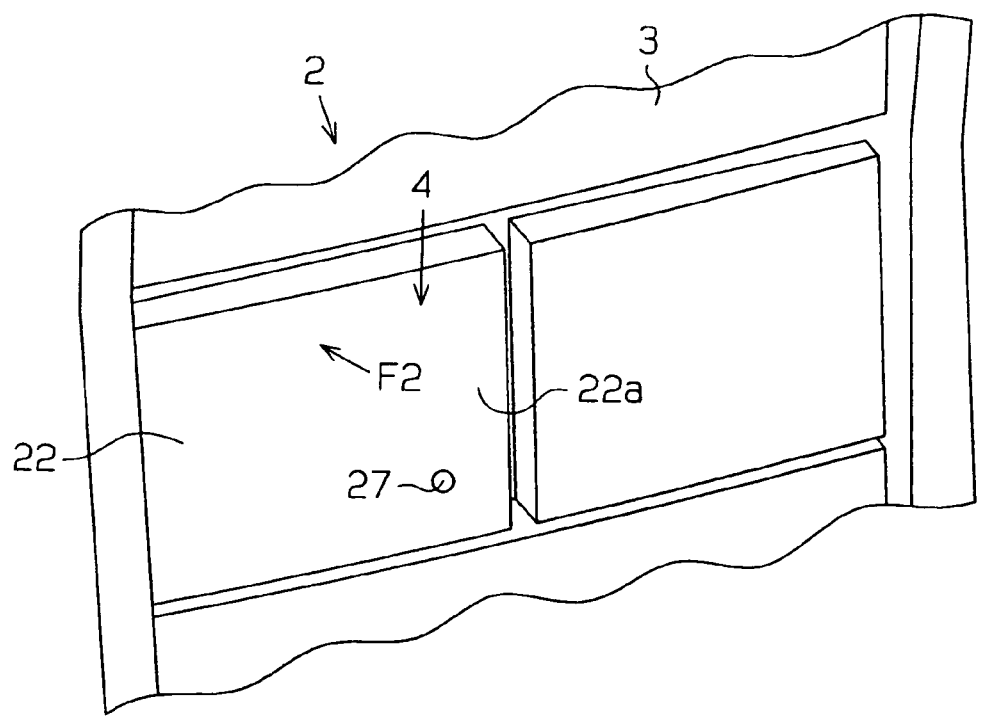
FIGS. 4A and 4B are perspective views showing the key holder of FIG. 1.
Figure 4B:
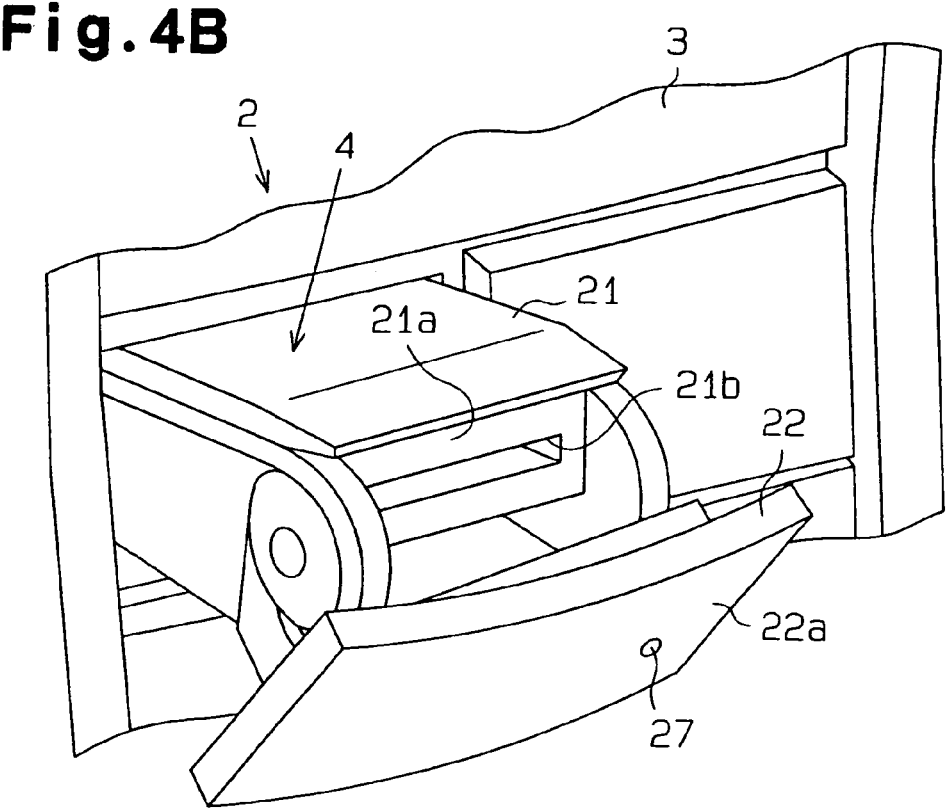

The holder 21 is movable between a position in which it is accommodated in the instrument panel 2 as shown in the state of FIG. 4A and a position in which it is projected from the instrument panel 2 as shown in the state of FIG. 4B. Referring to FIG. 4B, the holder 21 includes a key receiver 21a, which has a key slot 21b. The portable device 5 is inserted in the key slot 21b. The portable device 5 is, for example, card-like shaped.

As shown in the state of FIG. 4A, the key cover 22 covers the holder 21 when the holder 21 is accommodated in the instrument panel 2. The key cover 22 is moved to expose the key receiver 21a when the holder 21 is projected from the instrument panel 2, as shown in the state of FIG. 4B. In the preferred embodiment, the key cover 22 may be manually moved. More specifically, in the state of FIG. 4A, the key cover 22 is pushed toward the instrument panel 2 in the direction indicated by arrow F2. This opens the key cover 22 to expose the key receiver 21a as the holder 21 projects from the instrument panel 2. In the state of FIG. 4B, the key cover 22 is pushed toward the instrument panel 2. This moves the key cover 22 to close the holder 21 and accommodates the holder 21 in the instrument panel 2.

Referring to FIG. 5, the holder 21 includes a key controller 23, which controls the retraction and projection of the holder 21, a key sensor 24, a cover sensor 25, and a moving mechanism 26, which moves the holder 21. The key sensor 24 detects whether or not the portable device 5 is inserted in the key receiver 21a. The cover sensor 25 detects whether the key cover 22 is covering the holder 21. The moving mechanism 26 moves the portable device 5, in a state inserted in the key receiver 21a, into the holder 21 (retraction) and out of the holder 21 (projection).

The key controller 23 is a microcomputer, which includes a CPU, a ROM, and a RAM, and controls the moving mechanism 26 in accordance with control signals from the key sensor 24, the cover sensor 25, and a main microcomputer 31 of a vehicle controller 6. More specifically, when the key sensor 24 detects the insertion of the portable device 5 in the key receiver 21a, the key controller 23 provides the moving mechanism 26 with a retraction drive signal to retract the portable device 5 into the holder 21. If the portable device 5 is in the retracted state and the holder 21 is not covered when the key controller 23 receives an engine stop signal from the main microcomputer 31, the key controller 23 provides the moving mechanism 26 with a projection drive signal to project the portable device 5 from the holder 21.

Referring to FIGS. 4A and 4B, an indicator 27, which is formed by a light emitting device such as an LED, is arranged on an external surface 22a of the key cover 22. The indicator 27 is electrically connected to the key controller 23, as shown in FIG. 5. The key controller 23 has the indicator 27 indicate that the portable device 5 is in a state held in the holder 21 or inserted in the key receiver 21a. In the preferred embodiment, the indicator 27 is continuously illuminated if the portable device 5 is held in the holder 21 when the engine is running. If the portable device 5 is held in the holder 21 or inserted in the key receiver 21a when the engine is not running, the indicator 27 flashes and a buzzer (not shown) goes off.

The key verification unit 4 performs transponder communication with the portable device 5 when the portable device 5 is held in the holder 21. More specifically, the portable device 5 includes a transponder driver (not shown), and the holder 21 includes a transponder communicator (not shown). When the portable device 5 is held in the holder 21, the transponder communicator, which is located in the key controller 23, performs communication with the transponder driver of the portable device 5. As a result, a transponder code stored in the transponder driver is compared with a transponder code stored in the key controller 23. When the two transponder codes match, the key controller 23 provides the main microcomputer 31 with an electric signal indicating verification.

Referring to FIG. 5, the operation board 11 of the drive system operation apparatus 3 and the key verification unit 4 are electrically connected to the vehicle controller 6, which is installed in the vehicle 1. The vehicle controller 6 includes the vehicle control main microcomputer 31, which incorporates a gearshift control circuit, an engine control circuit, and a communication control circuit. The vehicle controller 6 also includes a transmission circuit 32 and a receiving circuit 33. In the operation board 11, the cover drive circuit 13, the gearshift operator 14, and the engine switch 15 are electrically connected to the main microcomputer 31. In the key verification unit 4, the key controller 23 is electrically connected to the main microcomputer 31. When the gearshift operator 14 and the engine switch 15 are operated, electric signals indicating the operation states of the gearshift operator 14 and the engine switch 15 are provided to the main microcomputer 31.

A gearshift range sensor 41, a door courtesy switch 42, a brake switch 43, a door lock driver 44, a transmission driver, or a shift by wire (SBW) circuit 45, an image recognizer 46 for recognizing whether the vehicle occupant is the authorized user, an engine driver 47, and an illumination device 48 are electrically connected to the main microcomputer 31.

The gearshift range sensor 41 is arranged in the transmission (not shown) to detect the present gearshift range of the transmission. The door courtesy switch 42 is arranged in each door of the vehicle 1 to detect the state (opened state and closed state) of the corresponding door. The brake switch 43 detects depression of a foot brake. The door lock driver 44 includes actuators for locking and unlocking the doors and drives the actuators in accordance with an electric signal provided from the main microcomputer 31. More specifically, the door lock driver 44 drives the actuators to unlock the doors when provided with an unlock command signal from the main microcomputer 31 and drives the actuators to lock the doors when provided with a lock command signal from the main microcomputer 31. The SBW circuit 45 switches the connection of the transmission in accordance with an electric signal provided from the main microcomputer 31. More specifically, the transmission includes an actuator that switches the connection of the transmission. The SBW circuit 45 drives the actuator in accordance with the electric signal (drive control signal) from the main microcomputer 31 to switch the connection of the transmission. The image recognizer 46 images the vehicle occupant (e.g., driver) with an imaging device, such as an infrared camera, that is arranged on a rearview mirror (not shown) to generate image data. The image recognizer 46 then determines whether the image data matches reference image data, which is stored beforehand, to perform image recognition. When the image data match, the vehicle occupant is verified as the authorized user. It is preferred that the image recognizer 46 verify the vehicle occupant as the authorized user using distinctive and physical features, such as the face, eyes, hands, and fingerprints of the authorized user.

The image recognizer 46 is activated in response to an activation signal provided from the main microcomputer 31 and provides the verification result to the main microcomputer 31. The engine driver 47 starts and stops the engine in accordance with an electric signal from the main microcomputer 31. More specifically, when a predetermined starting operation is performed after the engine driver 47 receives a start enabling signal from the main microcomputer 31, the engine driver 47 drives a self-starter motor (not shown) and performs fuel injection and ignition to start the engine. The engine driver 47 detects the drive state of the engine in accordance with an ignition pulse and an alternator output. When the engine is running, the engine driver 47 provides the main microcomputer 31 with a combustion signal. When the engine driver 47 is provided with a stop command signal from the main microcomputer 31, the engine driver 47 stops fuel injection and ignition to stop the engine. Further, the engine driver 47 stops the output of the combustion signal. The illumination device 48 illuminates the headlights, the taillights, the room light, and an instrument panel light for illuminating a combination meter 8 (FIG. 1).

Referring to FIG. 5, the vehicle controller 6 and the portable device 5 form a vehicle drive control system 7. When receiving a request signal from the vehicle controller 6, the portable device 5 modulates an ID code signal (response signal), which includes a predetermined ID code, to a radio wave having a predetermined frequency (e.g., 300 MHz) and automatically transmits the radio wave. In other words, the portable device 5 is provided with a function for communicating with the vehicle controller 6.

The main microcomputer 31 is electrically connected to the transmission circuit 32 and the receiving circuit 33. When predetermined conditions are satisfied, the main microcomputer 31 provides the transmission circuit 32 with a request signal. The transmission circuit 32, which includes an exterior transmission antenna 32a and an interior transmission antenna 32b, modulates the request signal from the main microcomputer 31 to a wireless signal having a predetermined frequency (134 kHz) and outputs the wireless request signal from the exterior transmission antenna 32a and the interior transmission antenna 32b. The exterior transmission antenna 32a transmits the wireless request signal to a predetermined first area around the vehicle 1. The interior transmission antenna 32b transmits the wireless request signal to a predetermined second area that includes at least the driver seat in the passenger compartment. In accordance with certain output conditions, the main microcomputer 31 transmits the wireless request signal from either the exterior transmission antenna 32a or the interior transmission antenna 32b.

The receiving circuit 33 includes a receiving antenna 33a for receiving an ID code signal returned from the portable device 5 in response to the request signal. When the receiving circuit 33 receives the ID code signal, the receiving circuit 33 demodulates the ID code signal to generate a received signal and provides the main microcomputer 31 with the received signal.

The main microcomputer 31 includes a central processing unit (CPU), a read only memory (ROM), and a random access memory (RAM), and a non-volatile memory 31a. A predetermined ID code is recorded in the memory 31a. When the receiving circuit 33 receives the ID code signal from the portable device 5, the main microcomputer 31 compares the ID code of the ID code signal with the ID code recorded in the memory 31a to perform ID code verification. Under the condition that the ID codes match, the main microcomputer 31 controls the cover drive circuit 13, the door lock driver 44, the image recognizer 46, and the illumination device 48. Based on the processing performed by the main microcomputer 31, the vehicle 1 enters modes that will now be discussed with reference to the flowcharts of FIGS. 6 and 7.

1. Regular Mode

Figure 6:
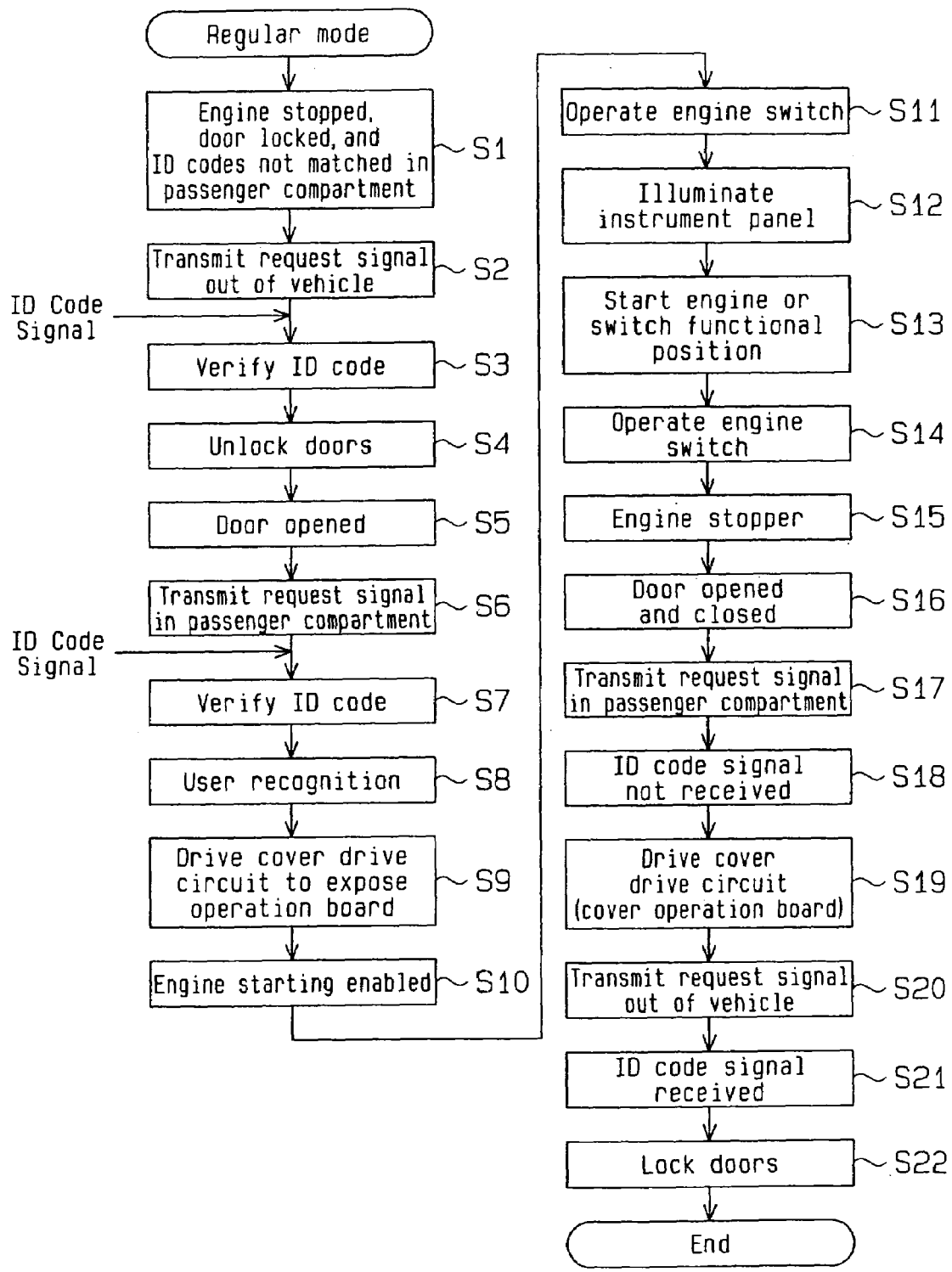
FIG. 6 is a flowchart for a regular mode.

In step S1 of FIG. 6, the engine is stopped, the doors are locked, and the ID codes are not matched in the passenger compartment. In this case, in step S2, the vehicle controller 6 transmits the request signal out of the vehicle 1. When the portable device 5 receives the request signal, the portable device 5 transmits the ID code signal. In step S3, the vehicle controller 6 verifies the ID code with the main microcomputer 31. When the ID code of the ID code signal matches the ID code recorded in the memory 31a of the main microcomputer 31, the main microcomputer 31 provides the door lock driver 44 with an unlock drive signal (step S4). Thus, as long as a user is carrying the portable device 5, the user only has to approach the vehicle 1 and does not have to perform any operations to unlock the doors.

When any of the door courtesy switches 42 detects the operation (opening and/or closing) of the corresponding door in step S5, the vehicle controller 6 outputs the request signal in the passenger compartment in step S6. In other words, when communication with the portable device 5 is established and the doors are unlocked, the vehicle controller 6 determines that communication has been established with the portable device 5 and enters a regular mode. Then, when a door is operated (opened and/or closed), the vehicle controller 6 outputs a request signal in the passenger compartment.

In response to the request signal, the portable device 5 transmits the ID code signal. When the vehicle controller 6 receives the ID code signal, the main microcomputer 31 verifies the ID code in step S7. If the ID code is verified, the vehicle controller 6 performs user recognition with the image recognizer 46 in step S8. More specifically, the main microcomputer 31 provides the image recognizer 46 with an activation signal to perform user recognition with the image recognizer 46. When the authorized user is confirmed through the user recognition process, the vehicle controller 6 activates the cover drive circuit 13 to expose the operation board 11 in step S9. In other words, when the main microcomputer 31 is provided with an electric signal indicating that the driver has been verified as being the authorized user, the main microcomputer 31 provides the cover drive circuit 13 of the drive system operation apparatus 3 with a drive signal to move the operation board cover 12 and expose the operation board 11 (as shown in the state of FIG. 3B). This enables the operation of the gearshift operator 14 and the engine switch 15. Thus, in the regular mode, the operation board 11 is exposed and the operations of the gearshift operator 14 and the engine switch 15 are enabled when the conditions of communication being properly performed between the portable device 5 and the vehicle controller 6 in the passenger compartment and the authorized user being verified are satisfied. In this manner, the vehicle controller 6 enters a state in which engine starting is enabled in step S10.

When the gearshift operator 14 is operated in this state, a corresponding operation signal is provided to the main microcomputer 31. In response to the operation signal from the gearshift operator 14, the main microcomputer 31 provides the SBW circuit 45 with a drive control signal for switching the connection of the transmission to the corresponding gearshift range. Then, the SBW circuit 45 switches the connection of the transmission in accordance with the drive control signal. Thus, the connection of the transmission is switched to a state corresponding to the operation of the gearshift operator 14.

The main microcomputer 31 does not provide the SBW circuit 45 with the drive control signal when the operation board 11 is in a state covered by the operation board cover 12. The main microcomputer 31 does not provide the SBW circuit 45 with the drive control signal even if an operation signal is received from the gearshift operator 14 unless the main microcomputer 31 outputs the drive signal for exposing the operation board 11. In other words, when the main microcomputer 31 is not providing the cover drive circuit 13 with the drive signal that exposes the operation board 11, the main microcomputer 31 invalidates the operation signal received from the gearshift operator 14. Thus, even if the gearshift operator 14 is operated in a state in which the operation board 11 is forcibly exposed, such as when the operation board cover 12 is broken, the connection (gearshift range) of the transmission cannot be switched. This improves the antitheft security of the vehicle 1.

In step S11, if the engine switch 15 is operated in the state in which engine starting is enabled, the corresponding operation signal is provided to the main microcomputer 31. When receiving the operation signal from the engine switch 15, the main microcomputer 31 provides the illumination device 48 with an activation signal and illuminates the instrument panel in step S12.

In the preferred embodiment, if the brake switch 43 is activated when the engine switch 15 is operated, the engine is started in step S13. More specifically, if the main microcomputer 31 is provided with a signal from the brake switch 43 indicating that the brake is being depressed when the engine switch 15 is operated, the main microcomputer 31 provides the engine driver 47 with a start signal. In response to the start signal, the engine driver 47 starts the engine.

If the brake switch 43 is not activated indicating that the brake is not being depressed when the engine switch 15 is operated, the functional positions of the electric system in the vehicle 1 is switched in step S13. In other words, if the main microcomputer 31 is not provided with a signal from the brake switch 43 indicating that the brake is being depressed when the engine switch 15 is operated, the functional position is switched in the order of OFF, ACC, and ON (ignition ON). The starting of the engine and the switching of functional positions are performed only when the gearshift range is in the P range or the N range. Further, the starting of the engine and the switching of functional positions are performed only when the operation board 11 is exposed. That is, in the same manner as the gearshift operator 14, the starting of the engine and the switching of functional positions are not performed when the operation board 11 is covered by the operation board cover 12 even if the engine switch 15 is operated. In other words, the main microcomputer 31 invalidates the engine switch 15 when the cover drive circuit 13 is not provided with the drive signal that exposes the operation board 11.

Subsequently, in step S14, if the vehicle velocity is zero and the gearshift range is in the P range or the N range, when the engine switch 15 is operated in step S14, the engine is stopped in step S15. If a door is opened and closed after the engine is stopped in step S16, the vehicle controller 6 transmits the request signal in the passenger compartment in step S17. If the ID code signal cannot be received in response to the request signal in step S18, the vehicle controller 6 drives the cover drive circuit 13 to cover the operation board 11 in step S19. That is, when the main microcomputer 31 does not receive the ID code signal, the main microcomputer 31 provides the cover drive circuit 13 of the drive system operation apparatus 3 with the drive signal that moves the operation board cover 12 and covers the operation board 11 (as shown in the state of FIG. 3A).

This disables the operation of the gearshift operator 14 and the engine switch 15. In the regular mode, when communication between the portable device 5 and the vehicle controller 6 is not established in the passenger compartment of the vehicle 1, the operation board 11 is covered and the operation of the gearshift operator 14 and the engine switch 15 are disabled.

In step S20, the vehicle controller 6 transmits the request signal out of the vehicle 1. If the ID code signal cannot be received in response to the request signal in step S21, the vehicle controller 6 locks the doors in step S22. That is, when the main microcomputer 31 does not receive the ID code signal, the main microcomputer 31 provides the door lock driver 44 with a lock drive signal to lock the doors. This returns the vehicle 1 to the state of step S1.

2. Irregular Mode

In step S31 of FIG. 7, the engine is stopped, the doors are locked, and the ID codes are not matched in the passenger compartment. In step S32, the vehicle controller 6 transmits the request signal out of the vehicle 1. When the ID code signal from the portable device 5 is not received in response to the request signal in step S33, the vehicle controller 6 keeps the doors locked. When a door is unlocked, for example, by a mechanical key in step S34 and the door is then operated (opened and/or closed) in step S35, the vehicle controller 6 does not transmit the request signal in the passenger compartment. This differs from the regular mode. That is, if the door is unlocked when communication with the portable device 5 is not established, the vehicle controller 6 enters an irregular mode and does transmit the request signal in the passenger compartment even if the door is opened.

The portable device 5 is inserted in the holder 21 of the key verification unit 4 in step S36. Then, in step S37, transponder communication is performed between the portable device 5 and the key verification unit 4, and the key controller 23 performs transponder code verification. When the transponder code is verified, the vehicle controller 6 performs user verification with the image recognizer (step S38). When the user is verified, the vehicle controller 6 drives the cover drive circuit 13 to expose the operation board 11 of the drive system operation apparatus 3 (step S39). This enables the operation of the gearshift operator 14 and the engine switch 15. In the irregular mode, the operation board 11 is exposed to enable the operation of the gearshift operator 14 and the engine switch 15 only when the portable device 5 is received in the key verification unit 4. In step S40, the vehicle controller 6 enables the starting of the engine. In the same manner as in the regular mode, when the gearshift operator 14 is operated in this state, the connection of the transmission is switched accordingly.

When the engine switch 15 is operated in a state in which the starting of the engine is enabled in step S41, the vehicle controller 6 illuminates the instrument panel in step S42.

In the preferred embodiment, if the brake switch 43 is activated when the engine switch 15 is operated, the engine is started. If the brake switch 43 is inactivated when the engine switch 15 is operated, functional positions of the electric system in the vehicle 1 is switched (step S43).

Subsequently, if the vehicle velocity is zero and the gearshift range is in the P range or the N range when the engine is running in step S44, the engine is stopped when the engine switch 15 is operated in step S45. When the engine stops, the vehicle controller 6 causes the indicator 27, which is arranged on the key cover 22, to flash and the buzzer to go off. More particularly, the vehicle controller 6 provides the key controller 23 with an engine stop signal when the engine is stopped. When receiving the engine stop signal, the key controller 23 provides the indicator 27 with an activation signal to flash the indicator 27. This informs the user that the portable device 5 is being received in the key verification unit 4 and prevents the driver from forgetting to remove the portable device 5.

If the holder 21 of the key verification unit 4 is exposed when the indicator 27 is flashing, the key controller 23 provides the moving mechanism 26 with a drive signal to project the portable device 5 from the holder 21 in step S47. More specifically, for example, if the holder 21 is already in an exposed state when the engine is stopped, the key controller 23 causes the indicator 27 to flash and the buzzer to go off and immediately projects the portable device 5 from the holder 21. If the holder 21 is covered by the key cover 22 before the indicator 27 starts to flash, the key controller 23 causes the indicator 27 to flash and the buzzer to go off. Then, the key controller 23 projects the portable device 5 when the holder 21 becomes exposed. Normally, the key cover 22 is opened to expose the holder 21 when inserting the portable device 5 and when getting out of the vehicle 1. Automatic projection of the portable device 5 when the driver wishes to get out the vehicle 1 makes the key verification unit 4 more convenient.

When the portable device 5 is projected from the holder 21, the vehicle controller 6 drives the cover drive circuit 13 and covers the operation board 11 in step S48. More specifically, when transponder communication can no longer be established between the portable device 5 and the key controller 23, the main microcomputer 31 provides the cover drive circuit 13 with a drive signal to close the operation board cover 12 and cover the operation board 11 (as shown in the state of FIG. 3A). This disables the operation of the gearshift operator 14 and the engine switch 15. In the irregular mode, under the condition that transponder communication is not established between the portable device 5 and the key controller 23, the operations of the gearshift operator 14 and the engine switch 15 are disabled.

When the door is locked by a mechanical key or the like in step S49, the vehicle 1 returns to the state of step S31.

The preferred embodiment has the advantages described below.

(1) To operate the gearshift operator 14 and the engine switch 15, communication between the portable device 5 and the vehicle controller 6 or the key verification unit 4 must be established. Further, the image recognizer 46 must verify that the driver is the authorized user. That is, to drive the vehicle 1, in addition to holding the portable device 5, the driver must have his or her image registered beforehand. This prevents a third person from driving the vehicle 1 even if he or she is carrying the portable device 5. Thus, basically only the user can drive the vehicle 1.

(2) In the normal mode, that is, when the doors are unlocked through communication between the portable device 5 and the vehicle controller 6, the image recognizer 46 is activated when communication is established between the portable device 5 and the vehicle controller 6 in the passenger compartment. In the irregular mode, that is, when the doors are unlocked by a mechanical key or the like, the image recognizer 46 is activated when communication is established between the portable device 5 and the key verification unit 4. Accordingly, the image recognizer 46 is activated at different timings in the regular mode and the irregular mode. The image recognizer 46 is activated only when necessary in each mode. This prevents unnecessary activation of the image recognizer 46 and decreases the power consumption of the image recognizer 46.

If the activation timing of the image recognizer 46 in the regular mode and the irregular mode were the same, for example, if the image recognizer 46 were to be activated after unlocking the doors in both modes, the image recognizer 46 would be activated regardless of whether or not the user gets into the vehicle 1. In such a case, the image recognizer would be activated in an unnecessary manner and unnecessary power would be consumed.

(3) Subsequent to the opening of a door in the regular mode, the main microcomputer 31 activates the image recognizer 46 when transmitting the request signal in the predetermined area of the passenger compartment in the vehicle and receiving the ID code signal from the portable device 5. Thus, the image recognizer 46 is activated only when the user enters the vehicle 1. This reduces the amount of power consumed by the image recognizer 46.

(4) The key cover 22 covers the holder 21. If the key cover 22 is opened to expose the holder 21 when the portable device 5 is held in the holder 21 and the engine is stopped, the portable device 5 is automatically projected from the holder 21. Normally, the key cover 22 is moved to expose the holder 21 when inserting the portable device 5 and when getting off the vehicle 1. The automatic projection of the portable device 5 when the user get out the vehicle 1 makes the key verification unit 4 convenient and easy to operate.

(5) When the portable device 5 is inserted in the key receiver 21a of the holder 21, the portable device 5 is automatically retracted into the holder 21. This ensures and facilitates the retraction of the portable device 5 in the holder 21. Thus, the key verification unit 4 is easy to operate.

(6) If the engine is stopped when the holder 21 is in an exposed state, the portable device 5 is automatically projected from the holder 21 as the engine stops. In other words, even if the vehicle is driven without closing the holder 21 with the key cover 22, the portable device 5 is automatically projected when the engine is stopped. This makes the key verification unit 4 easy to operate.

(7) The operation board cover 12 covers the gearshift operator 14 and the engine switch 15, which are operated to drive the vehicle 1. This prevents a third person from operating the gearshift operator 14 and the engine switch 15. Further, the gearshift operator 14 and the engine switch 15 cannot be seen from outside the vehicle 1. This helps to lessen a third person's incentive to break into the vehicle 1 and improves the security level of the vehicle 1. Further, the close location of the gearshift operator 14 and the engine switch 15 facilitate their operations.

(8) The operation board cover 12 does not expose the gearshift operator 14 and the engine switch 15 unless communication is established between the portable device 5 and the vehicle controller 6 or the key verification unit 4. This prevents someone other than the user from operating the gearshift operator 14 and the engine switch 15 and improves the security level of the vehicle 1.

(9) The parking switch 14a and the gearshift switch 14b operate the transmission, and the engine switch 15 starts and stops the engine. In comparison with the mechanical gearshift operator and engine operator of the prior art such as a gearshift lever and an ignition key cylinder, the parking switch 14a, the gearshift switch 14b, and the engine switch 15 have a more simple and compact structure. Further, the positions of the switches 14a, 14b, and 15 may be determined with a high degree of freedom.

(10) When the operation board 11 is covered by the operation board cover 12, even if the vehicle controller 6 receives an operation signal from the gearshift operator 14 or the engine switch 15, the vehicle controller 6 invalidates the operation signal. That is, when the gearshift operator 14 and the engine switch 15 are in a covered state, even if the operation board cover 12 is broken and the switches 14a, 14b, and 15 are operated, such operation would not switch the gearshift range or start the engine. This further improves the security level of the vehicle 1.

(11) The gearshift operator 14 includes the parking switch 14a and the gearshift switch 14b. Each of the switches 14a and 14b is associated with at least one gearshift range of the transmission. More specifically, when the parking switch 14a is operated, the gearshift range is switched to the P range, and when the gearshift switch 14b is operated, the gearshift range is switched to the P, R, N, or D range. Thus, the operation of the switch associated with the desired gearshift range easily and quickly switches the gearshift range. Further, regardless of whether the gearshift range is in the R, N, or D range, the parking switch 14a may be operated to immediately switch to the P range. This facilitates the switching of gearshift ranges.

It should be apparent to those skilled in the art that the present invention may be embodied in many other specific forms without departing from the spirit or scope of the invention. Particularly, it should be understood that the present invention may be embodied in the following forms.

Either the parking switch 14a or the gearshift switch 14b may be eliminated. For example, the parking switch 14a may be eliminated and the gearshift switch 14b may be used to switch the gearshift ranges between the P, R, N, and D ranges.

The gearshift operator 14 is not limited to the two switches, the parking switch 14a and the gearshift switch 14b, and may include three or more switches. For example, the gearshift operator 14 may include four push button switches, each corresponding to one of the P, R, N, and D ranges. This would enable switching to the desired gearshift range by operating the corresponding switch.

In addition to the parking switch 14a, an independent neutral switch for switching the gearshift range to the neutral range may be arranged on the gearshift operator 14. Operation of the neutral switch would enable the gearshift range to immediately be switched to the N range regardless of the present gearshift range. An independent drive switch for switching the gearshift range to the D range or an independent reverse switch for switching the gearshift range to the R range may be arranged on the gearshift operator 14. This would enable the vehicle 1 to be moved (forward or rearward) immediately after the engine is started. Further, erroneous operation resulting from forward or rearward movement of the vehicle 1 would be prevented. It is preferred that the gearshift range not be switched when operating the drive switch or the reverse switch unless the vehicle velocity is zero and the brake pedal is depressed.

The gearshift switch 14b does not have to be a lever switch and may be any kind of switch, such as a slide switch, a seesaw switch, or a rotary switch.

The drive system operation apparatus 3 does not have to be arranged in the instrument panel 2 between the driver seat and the passenger seat as long as it is located near the driver seat. For example, referring to FIG. 1, the drive system operation apparatus 3 may be arranged in a center console 9, a portion 2a of the instrument panel 2 located near the driver side door, or a steering column 10.

The gearshift range indicator 16 may be eliminated. In such a case, it is preferred that a gearshift range indicator 51 be arranged in the combination meter 8 as shown in FIG. 1 to indicate the gearshift range.

The cover drive circuit 13 may be eliminated, and the operation board cover 12 may be moved manually. In this case, it is preferred that movement of the operation board cover 12 be disabled when communication is not established between the portable device 5 and the vehicle controller 6 or the key verification unit 4.

The key cover 22 may be driven by a cover driver similar to the cover drive circuit 13 of the drive system operation apparatus 3. For example, the key cover 22 may be closed to cover the holder 21 when the portable device 5 is either retained in the holder 21 or removed from the holder 21. This would eliminate the need to manually cover the holder 21 and make it further easier to operate the key verification unit 4. Further, this would avoid situations in which the driver forgets to cover the holder 21 and guarantees a high security level.

The starting of the engine may be enabled when the holder 21 of the key verification unit 4 is exposed. In other words, even if the holder 21 is exposed, the key controller 23 provides the main microcomputer 31 with an electric signal indicating that the transponder codes have matched (electronic signal enabling the driving of the engine) when transponder communication is established. However, the key controller 23 may prohibit the output of the electric signal, which enables the starting of the engine, until the key cover 22 covers the holder 21 even if transponder communication is established with the portable device 5. This would enable the starting of the engine only when the portable device 5 is inserted in the holder 21 and the key cover 22 covers the holder 21.

The key verification unit 4 does not have to be arranged in the instrument panel 2 between the driver seat and the passenger seat as long as it is located near the driver seat. For example, referring to FIG. 1, the key verification unit 4 may be arranged in the center console 9, the portion 2a of the instrument panel 2 located near the driver side door, or the steering column 10.

The combination meter 8 may indicate whether or not the portable device 5 is being held in the holder 21.

The portable device 5 does not have to be provided with a transponder function. In this case, a further key provided with the transponder function is used in addition to the portable device 5. The further key is retained in the key verification unit 4 to enable the vehicle 1 to be driven. In other words, the key verification unit 4 does not have to hold only the portable device 5 but may also hold a further key.

The image recognizer 46 may be activated when communication with the portable device 5 is established and the doors are operated (opened and/or closed) after they are unlocked. The image recognizer 46 may also be activated when a seat sensor, which is arranged in the driver seat, detects a person sitting on the seat. This would eliminate the need for the vehicle controller outputting the request signal in the passenger compartment.

The image of the authorized user must be registered beforehand in the image recognizer 46. In other words, when people other than the owner uses the vehicle 1, everyone must be registered in the image recognizer 46 as an authorized user. To register someone other than the owner as the authorized user, it is preferred that an imaging device, such as a camera, be arranged in the vehicle facing towards the passenger seat. When the passenger seat imaging device images the same person a predetermined number of times, that person's image may automatically be recorded in the image recognizer 46 and be registered as image data of the authorized user. This would register a person sitting on the passenger seat a predetermined number of times as an authorized user and simplify user registration.

It is preferred that the image recognizer 46 use distinctive physical features of an authorized user, such as the face, eyes, hand, and fingerprints, to recognize an authorized user.

The present examples and embodiments are to be considered as illustrative and not restrictive, and the invention is not to be limited to the details given herein, but may be modified within the scope and equivalence of the appended claims.

What is claimed is:

1. A controller of a vehicle having an engine for use with an authorized key having a communication function, the vehicle including a passenger compartment, a door, and a key receiver arranged in the passenger compartment to receive the authorized key, the controller comprising:

a microcomputer for controlling the engine, the microcomputer being capable of communicating wit the authorized key;

a recognizer activated when predetermined conditions, including establishment of communication between the microcomputer and the authorized key, are satisfied to verify whether a vehicle occupant is an authorized user, the microcomputer enabling the starting of the engine when communication is established with the authorized key and the recognizer verifies the vehicle occupant as being the authorized user;

wherein the microcomputer transmits a request signal to a predetermined first area defined around the vehicle, and the authorized key outputs a response signal in response to the request signal, the microcomputer unlocking the door when receiving the response signal and entering a regular mode to activate the recognizer when the door is opened, the microcomputer entering an irregular mode to keep the recognizer inactivated when the door is unlocked even though the response signal is not received, and the microcomputer activates the recognizer in the irregular mode when communication is established with the authorized key received in the key receiver.

2. The controller according to claim 1, wherein the microcomputer transmits the request signal to a predetermined second area defined in the passenger compartment after the door is opened in the regular mode, and the microcomputer activates the recognizer when receiving the response signal from the authorized key in response to the request signal.

3. The controller according to claim 1, wherein the recognizer detects a distinctive feature of the vehicle occupant to verify that the vehicle occupant is the authorized user.

4. The controller according to claim 1, wherein the recognizer images the vehicle occupant to generate image data and compares the image data with reference image data that is registered beforehand.

5. A method for controlling a vehicle having an engine and a door, the method comprising:

transmitting a request signal to a predetermined area defined around the vehicle;

unlocking the door when receiving a response signal in response to the request signal;

verifying whether a vehicle occupant is an authorized user; and enabling starring of the engine when the vehicle occupant is verified as the authorized user;

wherein said verifying is performed after the response signal is received and the door is opened, but is not performed unless a predetermined condition is satisfied when the door is unlocked even though the response signal is not received, and wherein the predetermined condition includes establishment of transponder communication with an authorized key located in a key receiver that is arranged in the passenger compartment.

6. The method according to claim 5, wherein said verifying includes detecting a distinctive feature of the vehicle occupant and comparing the detected distinctive feature with reference data that is registered beforehand.

7. The method according to claim 5, wherein said verifying includes imaging the vehicle occupant to generate image data and comparing the image data with reference image data that is registered beforehand.

* * * * *

UNITED STATES PATENT AND TRADEMARK OFFICE
CERTIFICATE OF CORRECTION

PATENT NO. : 7,171,293 B2
APPLICATION NO. : 10/723006
DATED : January 30, 2007
INVENTOR(S) : Takashi Ichikawa et al.

It is certified that error appears in the above-identified patent and that said Letters Patent is hereby corrected as shown below:

Column 14
Line 26, delete "wit" and insert therefor -- with --.

Column 15
Line 5, delete "starring" and insert therefor -- starting --.

Signed and Sealed this

Twenty-ninth Day of May, 2007

JON W. DUDAS
*Director of the United States Patent and Trademark Office*